March 23, 1971 J. R. BYRNE 3,572,424
DOUBLE ACTING EJECTING MECHANISM
Filed Sept. 5, 1968 2 Sheets-Sheet 1

Inventor
John R. Byrne
By
Wheeler, Wheeler, House & Clemency
Attorneys

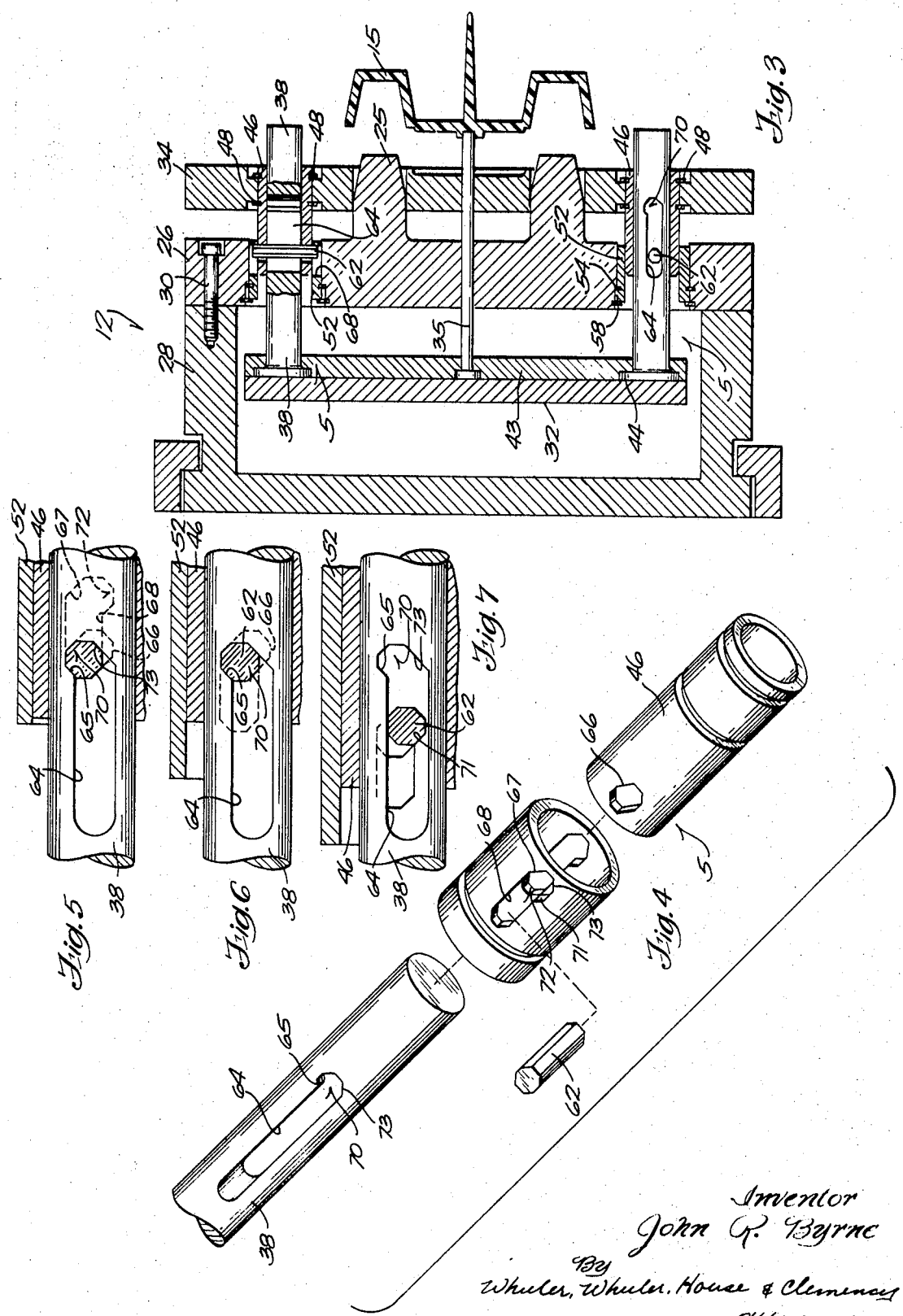

United States Patent Office 3,572,424
Patented Mar. 23, 1971

3,572,424
DOUBLE ACTING EJECTING MECHANISM
John R. Byrne, 1519 Prospect St.,
Watertown, Wis. 53094
Filed Sept. 5, 1968, Ser. No. 757,568
Int. Cl. B22d *17/22*
U.S. Cl. 164—347                    10 Claims

ABSTRACT OF THE DISCLOSURE

Disclosed herein is a mold or die having double acting thrust transmitting stripping and knock-out devices each of which includes a thrust pin having a slot with a laterally offset notch, a first sleeve mounted on said thrust pin and having an angularly disposed slot, a second sleeve concentrically mounted on said first sleeve and having a slot with a laterally offset notch, and a lock pin arranged in the slots to lock the first sleeve either to the thrust pin or to the second sleeve depending on the position of the lock pin in the notches of the slot.

BACKGROUND OF THE INVENTION

The present invention relates to die or mold apparatus and more particularly to the devices for ejecting the molded article from such apparatus. Two basic types of ejection mechanisms are presently used to remove the molded article from the mold, namely, ejector pin ejection and stripper plate ejection. Efforts to combine these two mechanisms have heretofore involved the use of complicated mechanisms including springs, chain pulls and stripper bolts which require considerable space in the operative part of the moveable mold.

SUMMARY OF THE INVENTION

The present invention provides a self-contained thrust transmitting device for stripping and ejecting a molded article and which can be incorporated in conventional molds or dies. The thrust transmitting device may take various forms, such as mutually slidable thrust bars. In the exemplary embodiment, the thrust transmitter includes a thrust pin secured to an ejector plate having ejector pins, a first sleeve mounted on the thrust pin and secured to a stripper plate, a second sleeve mounted on the first sleeve and secured to the support plate and a lock pin or key which is adapted to lock the first sleeve or stripper plate either to the thrust pin or ejector plate or to the second sleeve or support plate. This arrangement of the thrust pin and sleeves allows the ejector plate and stripper plate to initially move simultaneously to strip the molded article from the mold and then allows the ejector plate and ejector pins to move independently of the stripper plate to eject or knock-out the molded article from the stripper plate. In addition, the thrust transmitting device provides positive mechanical action on closing the mold.

Other objects and advantages will become apparent from the following detailed description when read in connection with the accompanying drawings in which:

FIG. 3 is a sectional view of the same mold with the ejector plate moved to the ejecting position.

FIG. 4 is an exploded perspective view of the disclosed embodiment of thrust transmitting device.

FIG. 5 is an enlarged view partly broken away of the thrust transmitting device in the position shown in FIG. 1.

FIG. 6 is an enlarged view partly broken away of the thrust transmitting device in the position shown in FIG. 2.

FIG. 7 is an enlarged view partly broken away of the thrust transmitting device in the position shown in FIG. 3.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
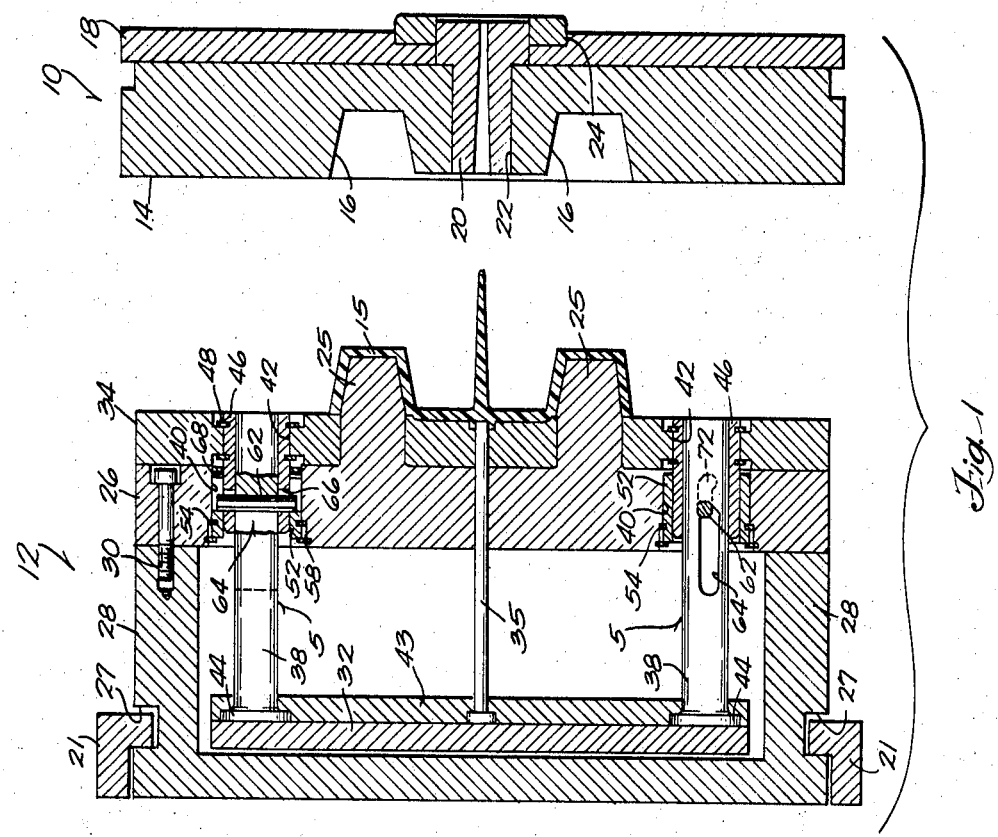
FIG. 1 is a sectional view of an injection mold in the open position, the stripper plate being shown in retracted position.

Referring to FIG. 1 of the drawing, an injection mold which is typical of molds and dies to which the invention relates is shown having a fixed mold section 10 and a movable mold section 12. The mold sections 10, 12 are adapted to be mounted in conventional injection molding apparatus in which the movable mold section 12 is reciprocally moved through a predetermined cycle to close the mold sections to mold an article 15 and to open the mold to eject the molded article 15. The thrust transmitting devices 5 of this invention are shown mounted in the moveable mold section 12 to aid in ejecting the molded article 15 from the mold section 12 when the mold is opened and to aid in positively closing the section 12 when the mold is closed.

The fixed mold section 10 includes a cavity plate 14 secured to a clamp plate 18 with a sprue bushing 20 centered in an aperture 22 in the cavity plate 14 by a locating ring 24. Mold cavities 16 are provided in the face of the cavity plate 14 to form the outer wall surfaces for the molded article 15.

The movable section 12 includes a support plate 26 secured to a base 28 by cap screws 30. Stripper plate 34 is moveable with respect to support plate 26 and is connected to ejector plate 32 by double acting ejecting mechanism embodying the invention and comprising thrust transmitting devices 5.

The moveable mold section 12 is secured to the moveable plate of the injection molding machine (not snown) by positioning L-shaped brackets 21 engaged in notches 27 in the mold section base 28. Mold cores 25 are provided on the support plate 26 to define the inside wall surface for the molded article 15. Ejector pins 35 are mounted on the ejector plate 32 to eject the molded article 15 from the stripper plate 34.

The thrust transmitting devices 5 function to sequentially separate the stripper plate 34 from the support plate 26, thus to eject the workpiece 15 from the cores 25, and thereafter move the ejector pins 35 relative to the stripper plate 34 to strip the workpiece 15 from the plate 34.

In the exemplary embodiment, the thrust transmitting devices 5 each comprise mutually telescopically related coupling elements including a thrust pin 38 and a pair of concentric coupling sleeves or coupling members 46 and 52. One of the sleeves is connected to the pin 38 during a portion of the reciprocal movement of the moveable section 12 and to the other sleeve during the remaining portion of the reciprocal movement of the section 12 by means of a cross key or lock pin 62. The thrust pins 38 are secured to the ejector plate 32 by a retainer plate 43 which engages an enlarged boss 44 on the thrust pin 38 and extend through corresponding apertures 40 in the support plate 26 and corresponding apertures 42 in the stripper plate 34. The inside or stripper sleeve 46 is mounted for axial motion on the thrust pin 38 and is coupled to stripper plate 34 by snap rings 48. The outside or support sleeve 52 is mounted for axial motion on the first sleeve 46 and is coupled to support plate 26 by means of snap rings 54 and 58.

The stripper plate coupled sleeve 46 is selectively and sequentially connected to either of the thrust pin 38 or the support plate coupled sleeve 52 by means of the cross key or lock pin 62. Pin 62 is positioned in a slot 64 provided in the thrust pin 38 and extends outwardly through slots 66 in sleeve 46 into slots 68 in sleeve 52. The slots 64, 66 and 68 are arranged to provide lost motion connection of the key 62 sequentially with the outer support plate coupled sleeve 52 and then with the pin 38. The lock pin 62 is initially retained in locking engagement with the sleeve 46 and thrust pin 38 and is then shifted into locking engagement with the first sleeve 46 and the second sleeve 52.

Shifting of the lock pin 62 is accomplished by providing a laterally offset notch 70 at the end of slot 64 in the thrust pin 38 and laterally offset notches 72 at the end of slots 68 in sleeve 52. The notches 70 and 72 are offset in opposite directions with notch 70 in thrust pin 38 aligned with a slot 68 in sleeve 52 and notch 72 in sleeve 52 aligned with slot 64 in thrust pin 38. The key 62 is moveable in slot 68 in sleeve 52 when in notch 70 in pin 38 and is moveable in slot 64 in pin 38 when in notch 72 in sleeve 52. The lock pin 62 is moved from one of the notches to the other by the lateral camming action produced by camming surface 65 in notch 70 and camming surface 67 in notch 72 when moving in one direction and by camming surfaces 71 in notch 72 and camming surface 73 in notch 72 when moving in the other direction.

In describing the action of the thrust transmitting devices 5, it should be remembered that sleeve 52 moves reciprocably through a complete cycle each time a molded article is to be discharged from the mold. It should also be noted that the key 62 and sleeve 46 move with the sleeve 52 through a portion of each stroke of sleeve 52 and are locked to the pin 38 through the remaining portion of each stroke of sleeve 52. More particularly, FIGS. 5, 6 and 7 show schematic views of the position of the key 62 in slots 68 in sleeve 52 and slot 64 in pin 38 in various positions of sleeve 52 relative to pin 38. Assuming sleeve 52 is moving to the left in FIG. 5, the key 62 is shown in notch 70 at the end of slot 64 and aligned with slot 68. As the sleeve 52 moves to the left, cam surface 67 at the end of slot 68, as seen in FIG. 6, will engage the key 62 and cam surface 65 will force the key 62 to slide on cam surface 67 into notch 72. When the key 62 is seated in notch 72 at the end of slot 68, the key 62 will be aligned with slot 64 in pin 38, see FIG. 7, and will move with sleeve 52 through slot 64. Since sleeve 46 moves with key 62, sleeve 46 will also move with sleeve 52.

When the motion of sleeve 52 is reversed, key 62 will move through slot 64 in pin 38 until it engages cam surface 73 at the end of slot 64. Cam surface 71 in notch 72 will force the key 62 to slide on cam surface 73 into notch 70 in pin 38. Once key 62 is seated in the notch 70, it will be aligned with slot 68 and the sleeve 52 will move relative to the pin 38. Sleeve 46 will also be locked to pin 38.

The operation of the thrust transmitting devices 5 is described in connection with the three opening positions of the moveable member 12 shown in FIGS. 1–3 and 5–7. In FIGS. 1 and 5 the moveable member 12 is separated from the fixed member 10 and is in position to commence the ejecting of the molded article 15 from the mold. The key 62 is located in offset notch 70 in slot 64 and is aligned with slot 68 in sleeve 52. Relative movement between the ejector plate 32 and base 28 is accomplished by holding the ejector plate 32 fixed by means of a fixed stop (not shown) and moving the base 28 to the left in FIG. 1. It should be understood that the base 28 could be held in a fixed position and the ejector plate 32 moved to the right to also eject the molded article 15. As the base 28 is moved to the left, and toward the position of FIG. 2, sleeve 52 will move relative to pin 38 and sleeve 46 and the ejector plate 32 and stripper plate 34 will remain fixed. The support plate 26 will be moved away from the stripper plate 34.

Figure 2:
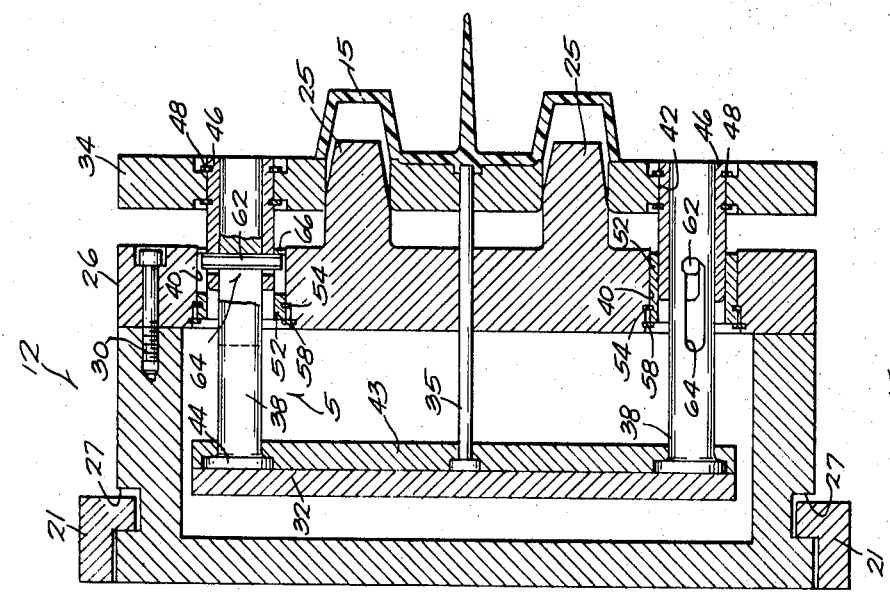
FIG. 2 is a sectional view of the same mold with the stripper plate moved to an open or stripping position.

Referring to FIGS. 2 and 6, the key 62 is shown at the end of slot 68 in engagement with cam surface 67 about to be cammed into notch 72 in support sleeve 52. This is accomplished by the camming action of surfaces 65 and 67 as described in connection with FIG. 6. When the base 28 reaches this position, the stripper plate 34 will be separated from the support plate 26 with the molded article 15 separated from the mold cores 25. Shifting of the lock pin 62 from notch 70 to notch 72 locks the stripper sleeve 46 in stripper plate 34 to the support sleeve 52 in support plate 26. The lock pin 62 will be aligned with slot 64 in pin 38. As the base 28 is moved further to the left, the stripper plate 34 and lock pin 62 move with the support plate 26. During this portion of the movement of the base 28, the thrust pin 38 remains fixed. The support plate 26 and stripper plate 34 are locked to the base 28 by the engagement of lock pin 62 with the stripper sleeve 46 and support sleeve 52. The lock pins 62 are moved to the end of slot 64 in the thrust pin 38 allowing for lost motion between the ejector pins 35 and the stripper plate 34. Referring to FIGS. 3 and 7, the base 28 is shown near the end of the ejector movement of the mold section 12 with the ejector pins 35 ejecting the molded article 15 from the stripper plate 34. Upon discharge of the molded article 15 from the mold, the motion of the base 28 is reversed to close the mold.

To close the mold, the moveable member 12 is moved toward the fixed member 10 to the right in the drawings. The end of the thrust pins 38 will engage the face of the cavity plate 14 stopping further movement of the ejector plate 32. The base 28, support plate 26 and stripper plate 34 will continue to move until the pin 62 reaches the end of slot 64 in thrust pin 38 and is cammed by camming surfaces 71 and 73 from notch 72 into notch 70 in the thrust pin 38 as shown in FIG. 6. The pin 62 is now aligned with slot 68 in sleeve 52 and the support plate 26 and base 28 will move relative to the stripper plate 34 and ejector plate 32. The base 28 and support plate 26 will continue to move until the support plate 26 abuts the stripper plate 34. The mold is then ready to repeat the cycle.

I claim:
1. A thrust transmitting device for molding apparatus comprising
   a thrust member,
   a first coupling member mounted for reciprocal movement through a predetermned cycle,
   a second coupling member,
   and connecting means connecting said second coupling member to said first coupling member during a portion of each reciprocal movement,
   said connecting means being shiftable to connect said second coupling member to said thrust member through the remaining portion of reciprocal movement of said first coupling member.

2. A device according to claim 1 wherein said thrust member is provided with a slot having an offset notch at its end,
   said first coupling member having a slot with an offset notch at its end,
   said notches being offset in opposite directions,
   said connecting means comprising a lock pin positioned in said slots.

3. A device according to claim 2 wherein said second coupling member is provided with a lateral slot, said lock pin extending through said lateral slot.

4. A device according to claim 1 wherein said thrust member comprises a pin, and said first and second coupling members comprise sleeves concentrically mounted on said pin.

5. A device according to claim 1 wherein the molding apparatus includes a support plate,
   a stripper plate and
   an ejector plate, said first coupling member being connected to the support plate, said second coupling member being connected to the stripper plate and said thrust member being connected to the ejector plate.

6. A thrust transmitting device for molding apparatus having a fixed mold section and a moveable mold section, said moveable section including a stripper plate, a support plate and an ejector plate, said device comprising a thrust pin secured to the ejector plate for movement therewith, a first sleeve secured to the stripper plate and being coaxially mounted on said thrust pin, a second sleeve secured to the support plate and coaxially mounted on said first sleeve, interconnecting means locking said first sleeve to said thrust pin through a portion of the movement of the ejector plate and locking said first sleeve to said second sleeve through the remaining portion of the motion of the ejector plate.

7. A device according to claim 6 wherein said thrust pin includes a slot having an offset notch on the end, said first sleeve includes an offset notch, said second sleeve includes a slot having an offset notch, and said interconnecting means being positioned in said slots, said notches in said first and second sleeves being offset opposite to said notch in said pin.

8. A lost motion transfer mechanism comprising a thrust member having a first slot, a first coupling member slidable with respect to the thrust member and having an angularly offset notch, a second coupling member slidable with respect to the thrust member and having a second slot, and a lock pin adapted for movement in said notch from a position in alignment with said first slot to a position in alignment with said second slot whereby said first coupling member is locked to said thrust member when said thrust member is aligned with said second slot and to said second coupling member when said lock pin is aligned with said first slot.

9. A motion transmitting device for molding apparatus and comprising a pin, a first coupling member, a second coupling member, means for reciprocally moving one of said coupling members, and a key connecting the other of said coupling members to said one of said coupling members during a portion of each reciprocal motion, and to said pin during the remaining portion of reciprocal motion.

10. A device according to claim 9 wherein said pin includes a slot with an angularly offset notch at the end, said first coupling member comprises a first sleeve concentrically mounted on said pin, and having an offset notch, said second coupling member comprises a second sleeve concentrically mounted on said first sleeve, and having a slot with a notch at the end angularly offset in the opposite direction from said notch in said pin, and said key being moveable in said notches between a position in alignment with the slot in the pin and a position in alignment with the slot in the second sleeve.

References Cited

UNITED STATES PATENTS 2,363,808  11/1944  Sayre ---------------- 18—16
3,293,697  12/1966  Balint.

J. SPENCER OVERHOLSER, Primary Examiner

R. S. ANNEAR, Assistant Examiner

U.S. Cl. X.R.

18—2; 74—110; 164—131, 404